United States Patent
Hashimoto et al.

(10) Patent No.: US 7,899,338 B2
(45) Date of Patent: Mar. 1, 2011

(54) METHOD AND DEVICE FOR CONTROLLING BIAS OF OPTICAL MODULATOR

(75) Inventors: Yoshihiro Hashimoto, Tokyo (JP); Junichiro Ichikawa, Tokyo (JP); Kaoru Higuma, Tokyo (JP); Takahisa Fujita, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 952 days.

(21) Appl. No.: 10/550,770

(22) PCT Filed: Mar. 26, 2004

(86) PCT No.: PCT/JP2004/004276

§ 371 (c)(1),
(2), (4) Date: Jun. 6, 2006

(87) PCT Pub. No.: WO2004/088397

PCT Pub. Date: Oct. 14, 2004

(65) Prior Publication Data

US 2007/0019968 A1    Jan. 25, 2007

(30) Foreign Application Priority Data

Mar. 28, 2003  (JP) ............................. 2003-092777
Sep. 26, 2003  (JP) ............................. 2003-334793

(51) Int. Cl.
*H04B 10/04*   (2006.01)
*H04B 10/121*  (2006.01)

(52) U.S. Cl. .................. 398/198; 398/182; 398/192; 398/195; 398/200; 398/201

(58) Field of Classification Search ......... 398/182–201; 359/239, 316

See application file for complete search history.

(56) References Cited

U.S. PATENT DOCUMENTS

| | | | |
|---|---|---|---|
| 5,805,321 A | | 9/1998 | Ooi et al. |
| 6,118,564 A | * | 9/2000 | Ooi et al. .................... 398/35 |
| 7,340,114 B2 | * | 3/2008 | Doi et al. ..................... 385/2 |
| 2001/0030791 A1 | * | 10/2001 | Taneda ...................... 359/181 |
| 2002/0171900 A1 | * | 11/2002 | Ono et al. ................... 359/181 |

* cited by examiner

FOREIGN PATENT DOCUMENTS

| | | |
|---|---|---|
| JP | S49-42365 | 4/1974 |
| JP | 3-145623 A | 6/1991 |
| JP | 03-251815 | 11/1991 |

OTHER PUBLICATIONS

Higuma, K., et al. (2002) X-cut LiNbO3 Optical SSB-SC Modulator, Technical Report 2002, Advanced Materials and Opto-Electronics, Sumitomo Osaka Cement Co., Ltd., 17-21.

*Primary Examiner*—M. R Sedighian
*Assistant Examiner*—Daniel G Dobson
(74) *Attorney, Agent, or Firm*—Chapman and Cutler LLP

(57) ABSTRACT

A method and device for adequately controlling the DC bias of each of the optical modulating sections of an optical modulator even while the optical modulator is operating in normal mode and even with a simple structure. An optical modulator bias controller (B) for controlling the DC bias of each optical modulating section of an optical modulator (1) is characterized by comprising DC bias application means (3) for applying a DC bias to each of the optical modulating sections, a low-frequency signal superimposing circuit (2) for superimposing a low-frequency signal $f_B$ with a specific frequency on a modulating signal b applied to each optical modulating section, optical sensing means (9) for sensing a change of the intensity of the light wave passing through the combining section, and bias control means (4) for extracting the change of the intensity of light corresponding to the low-frequency signal from the optical sensing means and controlling the DC bias application means according to the extracted change of the intensity of light.

10 Claims, 5 Drawing Sheets

(a)

(b)

METHOD AND DEVICE FOR CONTROLLING BIAS OF OPTICAL MODULATOR

BACKGROUND OF THE INVENTION (1) Field of the Invention

The present invention relates to a method and device for controlling bias of optical modulator, and more particularly to a method and device for controlling bias of optical modulator for adequately controlling the DC bias of each of a plurality of optical modulating sections of an optical modulator comprising the plurality of optical modulating sections therein.

(2) Related Art Statement

Optical modulator is frequently used as an electrical-optical conversion device in the field of optical communication or optical measurement.

An optical intensity modulator comprising a substrate with an electro-optic effect such as $LiNbO_3$ is cited as an example of the optical modulator. However, such optical modulator is known for causing a so-called drift phenomenon that the output characteristics of light change with time due to the amount of the applied DC bias for drive control or due to the temperature change of its operating environment.

As the method for controlling such drift phenomenon, the following patent documents 1 or 2 discloses a method for superposing a low frequency electrical signal on the driving signal of an optical modulator, monitoring the change of light intensity related to said low frequency electrical signal included in the output light from said optical modulator, and detecting a bias point against the actual applied voltage, and further combining the method with a bias compensating circuit for controlling a DC bias to be applied into the optical modulator to enable automatic correction of optical response characteristics so as to make the most appropriate bias point.

[Patent Document 1] Japanese Patent Laid-open No. S49-42365

[Patent Document 2] Japanese Patent Laid-open No. H03-251815

On the other hand, an optical communications system capable of high density, high speed and long distance transmission is required corresponding to the increasing demand for telecommunications. Especially, it is necessary to develop a DWDM communications system. For this DWDM communications system, it is necessary to solve objects of increasing usability of frequency, increasing of nonlinear effect resistance (long distance telecommunications), or the like. The present applicant has proposed Single Side-Band (SSB) modulator as the modulator that excels in those characteristics.

One example of the SSB modulator is disclosed in the following non patent document 1.

[Non Patent Document] "X cut $LiNbO_3$ Optical SSB-SC modulator" (HIGUMA, Kaoru et al., p 17 to 21, "Technical Report 2002(Sumitomo Osaka Cement Co., Ltd.)", issued by Sumitomo Osaka Cement Co., Ltd, New Technology Research Center on Dec. 8, 2001)

The operation principle of the SSB modulator is explained.

FIG. 1 is a diagram showing a frame format of the optical waveguide of the SSB modulator, especially a Single Sideband with Suppressed Carrier (SSB-SC) modulator.

The optical waveguide as FIG. 1 is formed by diffusing Ti on a substrate with an electro-optic effect such as $LiNbO_3$. Said optical waveguide comprises nesting MZ structure which has two sub MZ (Mach-Zehnder) waveguides $MZ_A$ and $MZ_B$ placed in parallel in each arm of main MZ waveguide $MZ_C$.

$RF_A$ and $RF_B$ show simplified traveling-wave-type coplanar electrodes for applying the modulating signal of a microwave into sub MZ waveguides $MZ_A$ and $MZ_B$. In addition, $DC_A$ and $DC_B$ show simplified phase adjustment electrodes for applying direct voltages into sub MZ waveguides $MZ_A$ and $MZ_B$, and $DC_C$ shows a simplified phase adjustment electrode for applying a direct voltage into main MZ waveguide $MZ_C$ in order to provide them with a predetermined phase difference.

The principle of an SSB modulator without suppressed carrier is explained before explaining the operation in FIG. 1. SSB technology has been used in the area of wireless communication. It is known that SSB modulating signal is obtained by summing original signals and signals which are converted by using Hilbert conversion.

SSB modulation without suppressed carrier is obtained by using the dual driven single MZ modulator as shown in FIG. 2 (the example using Z cut substrate is shown in the figure).

Incident light as $\exp(j\omega t)$, single frequency RF signal, $\phi \cos \Omega t$, and a signal, converted by Hilbert conversion, $H[\phi \cos \Omega t] = \phi \sin \Omega t$ are simultaneously input from $RF_A$ port, and $RF_B$ port, respectively.

Because $\sin \Omega t = \cos(\Omega t - \pi/2)$, both signals can be input simultaneously by using a phase converter for microwave. However, $\phi$, $\omega$, and $\Omega$ mean modulation, optical wave, and frequency of microwave (RF) signal, respectively.

Moreover, phase difference $\pi/2$ is given to optical waves which pass through both arms of the MZ waveguide adding appropriate bias from $DC_A$ port.

Consequently, the formula focusing on the phase term of optical wave at multiplexed point becomes as the following formula (1).

$$\exp(j\omega t)*\{\exp(j\phi \cos \Omega t)+\exp(j\phi \sin \Omega t)*\exp(j\pi/2)\}= 2*\exp(j\omega t)*\{J_0(\phi)+j*J_1(\phi)\exp(j\Omega t)\} \quad (1)$$

Here, $J_0$ and $J_1$ are 0 and primary Bessel function and components after secondary are ignored.

As in the formula (1), 0 and primary spectrum remains, however, components at $-1(J_{-1})$ have been lost (When this is typically shown, the optical waves with spectrum distribution on the right side of the MZ waveguide in FIG. 2 exit from the MZ waveguide).

In addition, a bias adding a phase difference of $-\pi/2$ is applied into $DC_A$ port to retain components at $-1(J_{-1})$ and delete primary components $(J_1)$.

Subsequently, the Single Side—Band with Suppressed Carrier (SSB-SC) modulator has sub MZ interference systems added to both arms of single MZ interference system as shown in FIG. 1.

The signals as shown in FIG. 3 are applied into these sub MZ waveguides. This can be considered to be the same as normal intensity modulation performed by bottom drive.

Here, the following formula (2) is the phase term of outgoing light.

$$\exp(j\omega t)*\{\exp(j\phi \sin \Omega t)+\exp(-j\phi \sin \Omega t)*\exp(j\pi)\}= 2*\exp(j\omega t)*\{J_{-1}(\phi)\exp(-j\Omega t)=J_1(\phi)\exp(j\Omega t)\} \quad (2)$$

The above formula explains that even number spectrum components including carrier components are cancelled (When this is typically shown, the optical waves with spectrum distribution on the right side of the MZ waveguide in FIG. 3 exit from the MZ waveguide).

Then, by combining the above mentioned SSB modulation (formula (1), the modulation method shown in FIG. 2) and the carrier suppression method at sub MZ (formula (2), the modulation method shown in FIG. 3), it becomes possible to selectively generate either primary spectrum ($J_1$ term) or −1 spectrum ($J_{-1}$ term).

The frequency of primary spectrum light indicated by $J_1$ is $\omega+\Omega$, and the frequency of −1 spectrum light indicated by $J_{-1}$ is $\omega-\Omega$. This means that the light (frequency $\omega$)) entering the SSB modulator is wavelength-shifted only for the frequency of the microwave applied into the SSB modulator, and is emitted as an outgoing light (frequency $\omega\pm\Omega$).

As stated above, the SSB modulator can be used as a wavelength converter. In particular, the SSB-SC modulator can prevent the generation of 0 spectrum and generate primary or −1 spectrum effectively.

The optical modulator with three combined MZ waveguides as shown in FIG. 1 is called nesting type optical intensity modulator (OSSBM, Optical Single Side-Band Modulator) in particular.

Although various types of multifunction and high-performance optical modulators, each of which comprises a plurality of optical modulating sections therein, as stated above have been proposed, it is necessary to perform DC bias correction related to driving of the optical modulating sections to maintain an appropriate drive bias point because the drift phenomenon could occur at any time in the optical modulator having a substrate with an electro-optic effect as described above.

If the method for controlling drift phenomenon concerning the optical modulator as stated above is used, it becomes necessary to control three DC biases $DC_A$, $DC_B$ and $DC_C$ in the case of the nesting type optical intensity modulator in FIG. 1, for example. Further, in order to correct and control $DC_A$ and $DC_B$, it is necessary to separately provide a detecting means for detecting optical waves passing through sub $MZ_A$ and $MZ_B$. Even if this is not provided, it is necessary, when $DC_A$ is controlled for example, to make the other MZ sections ($MZ_B$, $MZ_C$) not operate, or the like.

As stated above, configuration related to control of DC bias of optical modulator gets complicated in accordance with the increasing optical modulating sections. Further, there occurs the problem that correction is not possible in stationary optical communication or optical measurement because, when the input/output characteristics of a specific optical modulating section are measured, the other optical modulating sections are made not to operate.

The present invention intends to solve the above mentioned objects and to provide a method and device for controlling bias of optical modulator capable of adequately correcting the direct current bias of each of a plurality of optical modulating sections of an optical modulator comprising the plurality of optical modulating sections even while the optical modulator is operating in normal mode and even with a simple structure.

SUMMARY OF THE INVENTION

In order to solve the above described objects, the invention provides a method for controlling bias of optical modulator for controlling the DC bias of each of a plurality of optical modulating sections of an optical modulator comprising an optical waveguide formed on a substrate with an electro-optic effect, and said plurality of optical modulating sections for modulating optical waves propagating through said optical waveguide, the optical modulator being configured so as to combine the optical waves modulated by said plurality of optical modulating sections, comprising the steps of: superposing a low frequency electrical signal with a specific frequency on a modulating signal or a DC bias applied into each of said plurality of optical modulating sections; detecting the change of light intensity corresponding to said low frequency electrical signal from the optical wave after being combined; and controlling the DC bias of each optical modulating section based on said detected change of light intensity.

In addition, the invention provides the method for controlling bias of optical modulator, wherein said specific frequency differs between each optical modulating section.

In addition, the invention provides the method for controlling bias of optical modulator, wherein said different frequencies are made not to be an integral multiplication of each other.

In addition, the invention provides the method for controlling bias of optical modulator, wherein said low frequency electrical signal is superposed at different times on each optical modulating section.

In addition, the invention provides a method for controlling bias of optical modulator for controlling the DC bias of each of a plurality of optical modulating sections of an optical modulator comprising an optical waveguide formed on a substrate with an electro-optic effect, and said plurality of optical modulating sections for modulating optical waves propagating through said optical waveguide, the optical modulator being configured so as to combine the optical waves modulated by said plurality of optical modulating sections, comprising the steps of: superposing a low frequency electrical signal with a specific frequency on a modulating signal or a DC bias applied into at least one of said plurality of optical modulating sections; detecting the change of light intensity corresponding to said low frequency electrical signal from the optical wave exiting from the optical modulating section, into which said modulating signal or said DC bias superposed with said low frequency electrical signal is applied; and controlling the DC biases of all or some of said plurality of optical modulating sections based on said detected change of light intensity.

In addition, the invention provides the method for controlling bias of optical modulator, wherein said control of the DC biases of all or some of said plurality of optical modulating sections is performed by determining a controlled variable with respect to each optical modulating section based on said change of light intensity.

In addition, the invention provides a device for controlling bias of optical modulator for controlling the DC bias of each of a plurality of optical modulating sections of an optical modulator comprising a substrate with an electro-optic effect, an optical waveguide formed on said substrate, said plurality of optical modulating sections for modulating optical waves propagating through said optical waveguide, and a combining element provided for said optical waveguide for combining the optical waves modulated by said plurality of optical modulating sections, further comprising: a DC bias application means for applying a DC bias into each of said plurality of optical modulating sections; a low frequency electrical signal superposing circuit for superposing a low frequency electrical signal with a specific frequency on a modulating signal or a DC bias applied into each of said plurality of optical modulating sections; an optical detecting means for detecting the change of light intensity of the optical wave passing through said combining element; and a bias controlling means for extracting the change of light intensity corresponding to said low frequency electrical signal from said optical detecting means and also for controlling said DC bias application means based on said extracted change of light intensity.

In addition, the provides the device for controlling bias of optical modulator, wherein said low frequency electrical signal superposing circuit comprises a plurality of low frequency electrical signal generation elements for generating the low frequency electrical signal respectively corresponding to the plurality of optical modulating sections.

In addition, the provides the device for controlling bias of optical modulator, wherein said low frequency electrical signal superposing circuit comprises one low frequency electrical signal generation element for generating the low frequency electrical signal, and switches the low frequency electrical signal generated from said low frequency electrical signal generation element to supply the low frequency electrical signal to each optical modulating section.

In addition, the invention provides a device for controlling bias of optical modulator for controlling the DC bias of each of a plurality of optical modulating sections of an optical modulator comprising a substrate with an electro-optic effect, an optical waveguide formed on said substrate, said plurality of optical modulating sections for modulating optical waves propagating through said optical waveguide, and a combining element provided for said optical waveguide for combining the optical waves modulated by said plurality of optical modulating sections, further comprising: a DC bias application means for applying a DC bias into each of said plurality of optical modulating sections; a low frequency electrical signal superposing circuit for superposing a low frequency electrical signal with a specific frequency on a modulating signal or a DC bias applied into at least one of said plurality of optical modulating sections; an optical detecting means for detecting the change of light intensity corresponding to said low frequency electrical signal from the optical wave exiting from the optical modulating section, into which said modulating signal or said DC bias superposed with said low frequency electrical signal is applied; and a bias controlling means for extracting the change of light intensity corresponding to said low frequency electrical signal from said optical detecting means and also for controlling said DC bias application means of all or some of said plurality of optical modulating sections based on said extracted change of light intensity.

In addition, the invention provides the device for controlling bias of optical modulator, wherein said optical detecting means detects the optical wave emitted from said optical waveguide into said substrate.

In addition, the invention provides the device for controlling bias of optical modulator, wherein said optical detecting means detects the optical wave guided out by a directional coupler positioned adjacent to said optical waveguide.

In addition, the invention provides the device for controlling bias of optical modulator, wherein said optical detecting means detects the optical wave, which exits from said optical modulator and is thereafter branched by an optical branching means.

In addition, the invention provides the device for controlling bias of optical modulator, wherein said optical detecting means comprises at least two optical detectors or more.

In accordance with the method described above, by applying the specific low frequency electrical signal into each optical modulating section and detecting the change of light intensity corresponding thereto, it becomes possible to easily understand the state of the drift phenomenon of each optical modulating section. Further, control of the DC bias of each optical modulating section becomes possible even while using the optical modulator without complicating the optical modulator and bias controlling circuit too much.

In accordance with the invention, it is possible to understand the state of the drift phenomenon of each optical modulating section with respect to each frequency electrical signal corresponding to each optical modulating section. Moreover, because the low frequency electrical signals applied into the plurality of optical modulating sections respectively have different frequencies, it is possible to understand the behaviors of the plurality of optical modulating sections at the same time.

If the different frequencies are the integral multiplication of each other when understanding the state of the drift phenomena of the plurality of optical modulating sections at the same time, the problem could occur that an input/output characteristics change due to the low frequency electrical signal applied into the other optical modulating sections than the focused optical modulating section is detected as the characteristic of said focused optical modulation section. It is possible to solve such problem in accordance with the invention.

In accordance with the invention, control of the biases of the plurality of optical modulating sections becomes possible by delaying the timing of superposition even when there are only one or a few kinds of frequencies of the low frequency electrical signal.

In accordance with the method described above, the specific low frequency electrical signal is applied into at least one of the plurality of optical modulating sections to detect the change of light intensity corresponding to said low frequency electrical signal from the optical wave exiting from said optical modulating section. Then, based on said detected change of light intensity, the DC biases of the other optical modulating sections as well as the DC bias of said optical modulating section are controlled. Thus, it becomes unnecessary to superpose the low frequency electrical signal or to detect the output optical wave corresponding to each optical modulating section. This enables the DC bias of each optical modulating section to be easily kept in an adequate state without complicating the whole structure of the optical modulator. Further, the DC bias of each optical modulating section can be controlled even while the optical modulator is used.

The correlation between the drift phenomenon of the optical modulating section, into which the low frequency electrical signal is applied, and the drift phenomena of the other optical modulating sections is preliminarily determined by the design of the optical modulator, the characteristic measurement of each optical modulator, or the like. Then, it becomes possible to determine the controlled variable of each optical modulating section in reference to said correlation based on the change of light intensity of the optical modulating section into which the low frequency electrical signal is applied. In accordance with the invention, only by measuring the drift phenomena of some optical modulating sections, it becomes possible to adequately keep the controlled variable of each optical modulating section. Then, effective control becomes possible even while using the optical modulator without complicating the control mechanism of the optical modulator.

In accordance with the invention, by applying the specific low frequency electrical signal into each optical modulating section and detecting the change of light intensity corresponding thereto, the state of the drift phenomenon of each optical modulating section can be easily understood. Moreover, control of the DC bias of each optical modulating section becomes possible even while using the optical modulator without complicating the optical modulator and bias controlling circuit too much.

Especially in accordance with the invention, because the frequencies of the low frequency electrical signals applied respectively into the plurality of optical modulating sections are different, it is possible to understand the behaviors of the plurality of optical modulating sections at the same time. In addition, in accordance with the invention, the biases of the plurality of optical modulating sections can be controlled by switching and supplying the low frequency electrical signal to each optical modulating section even when the low frequency electrical signal has only one frequency.

In accordance with the invention, it becomes unnecessary to superpose the low frequency electrical signal or to detect the output optical wave corresponding to each optical modulating section and becomes possible to easily keep the DC bias of each optical modulating section in an adequate state without complicating the whole structure of the optical modulator. Further, control of the DC bias of each optical modulating section is possible even while using the optical modulator. Moreover, by preliminarily determining the correlation between the drift phenomenon of the optical modulating section, into which the low frequency electrical signal is applied, and the drift phenomena of the other optical modulating sections, it becomes possible to adequately control the DC bias of each optical modulating section by setup and arrangement of the bias controlling means.

For the optical modulator, the optical wave called stray light is emitted into the substrate from the combining element or the like of the optical waveguide. In accordance with the invention, said optical wave is effectively used to prevent deterioration of a signal light without detecting the signal light directly or one portion of it, the signal light exiting from the optical modulator.

In accordance with the invention, it is possible to anywhere detect the optical wave propagating through the optical waveguide on the substrate by using the directional coupler. Further, because the directional coupler can be formed by the same process as the optical waveguide on the substrate, it is possible to form it at the same time as the optical waveguide.

In accordance with the invention, because a light signal exiting from the optical modulator is directly detected, it becomes possible to accurately understand the input/output characteristics of the whole optical modulator or each optical modulating section. Moreover, even when it is difficult to place the optical detector adjacent to the optical modulator, an optical branching means, such as a branching waveguide, polarization beam splitter and photo coupler, is used for an optical path, such as an optical fiber, that guides the outgoing light from the optical modulator to the exterior, to thereby enable optical detection anywhere.

In accordance with the invention, the plurality of optical detectors are placed corresponding to the plurality of optical modulating sections to decrease the number of optical modulating sections assigned to one optical detector. Thus, it is possible to select the optical detector in accordance with the frequency of the low frequency electrical signal. This increases the range of said frequency choices while the burden on the circuit for extracting the change of light intensity corresponding to each low frequency electrical signal can be reduced.

DETAILED DESCRIPTION OF THE INVENTION

In the following, the preferred embodiments of the present invention are explained in detail.

Figure 4:
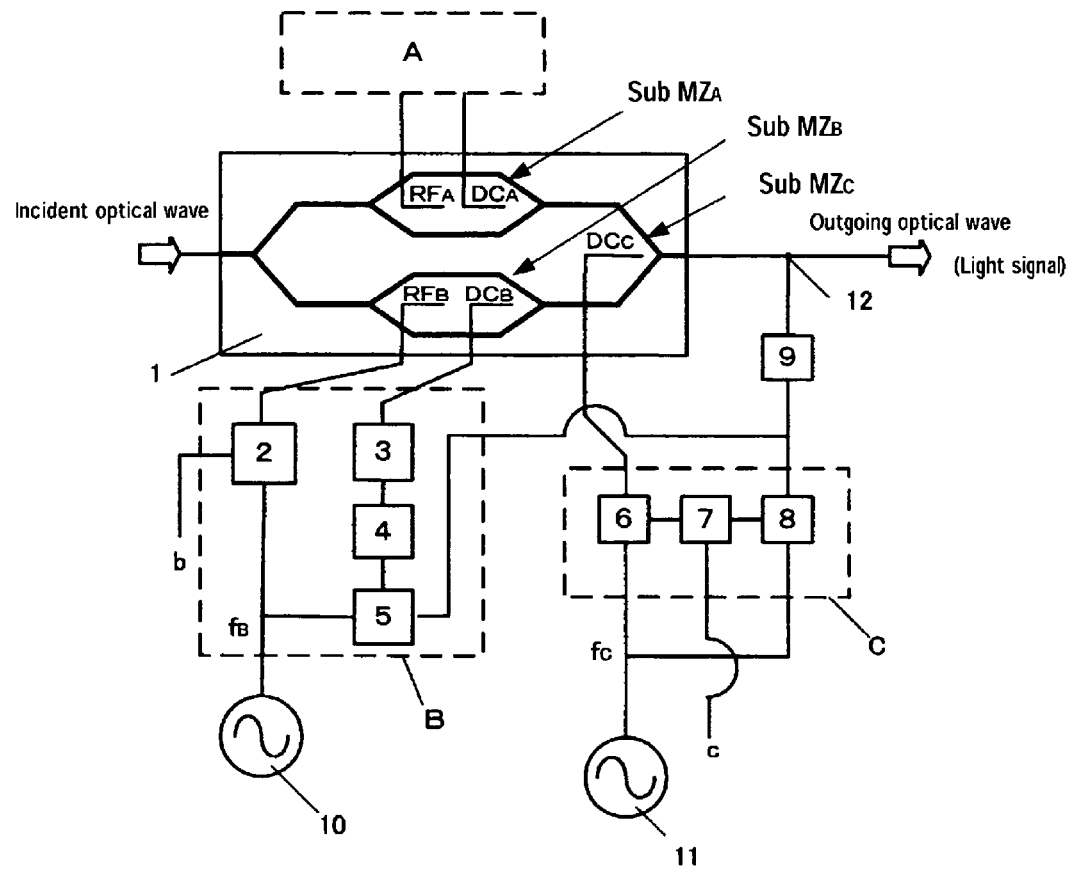
FIG. 4 is a schematic diagram of the device for controlling the bias of the optical modulator according to the present invention.

FIG. 4 is a schematic diagram of one embodiment of the device for controlling the bias of the optical modulator according to the present invention.

Figure 1:
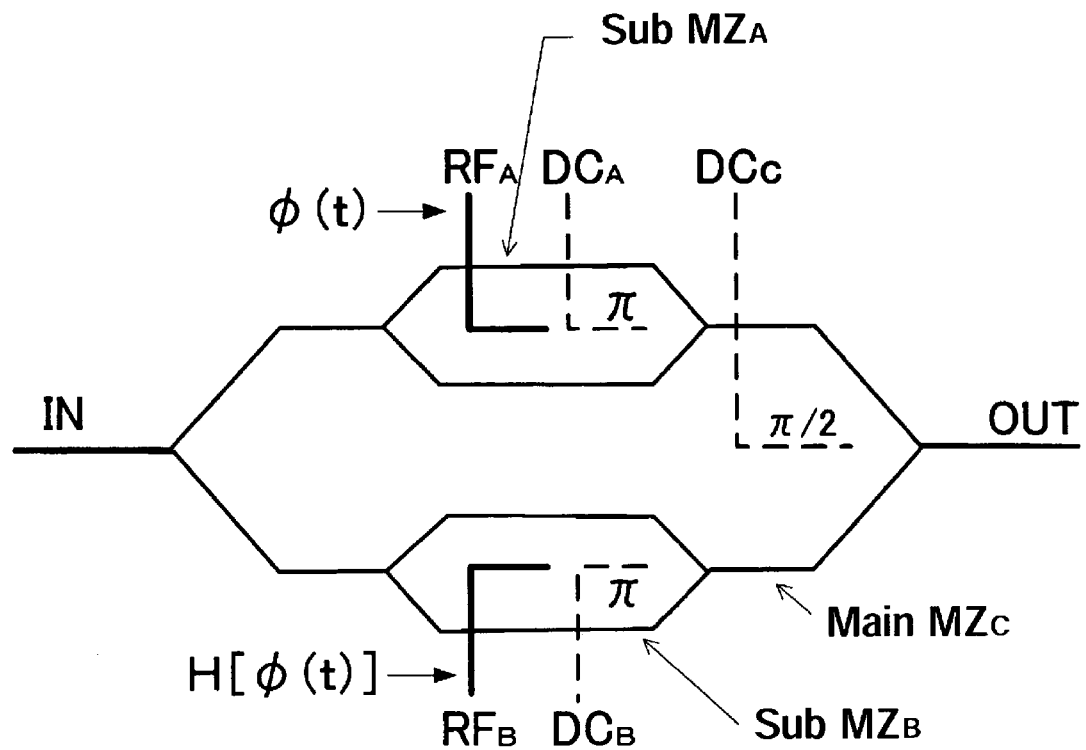
FIG. 1 is a schematic diagram of the SSB optical modulator.
Figure 2:
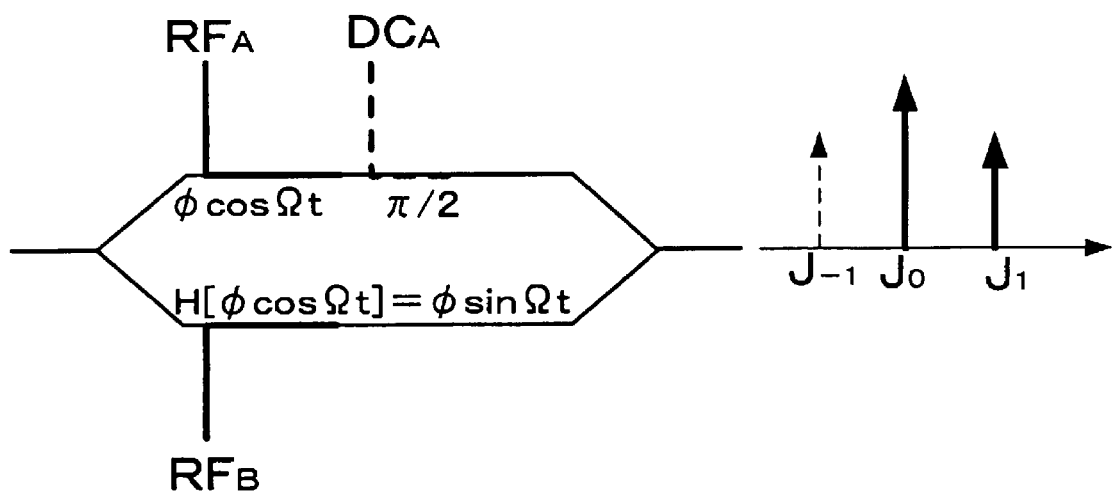
FIG. 2 is a diagram showing the function of the main MZ waveguide of the SSB optical modulator.

An optical modulator 1 is the nesting optical intensity modulator explained in FIG. 1. An optical wave such as a laser enters optical modulator 1, receives predetermined modulation while propagating through said optical modulator 1, and exits from optical modulator 1 as a light signal.

Although the nesting optical intensity modulator is explained as the example in the following, the present invention is not limited to this but it is possible to apply the present invention to an optical modulator comprised of a plurality of optical modulating sections (sections having the function of intensity modulation or phase modulation) combined together.

The sub MZ type optical waveguides $MZ_A$, $MZ_B$ and main MZ type optical waveguide $MZ_C$ are formed in optical modulator 1. At the same time, a plurality of optical modulating sections are formed therein by various modulating electrodes provided corresponding to said optical waveguides.

Figure 3:
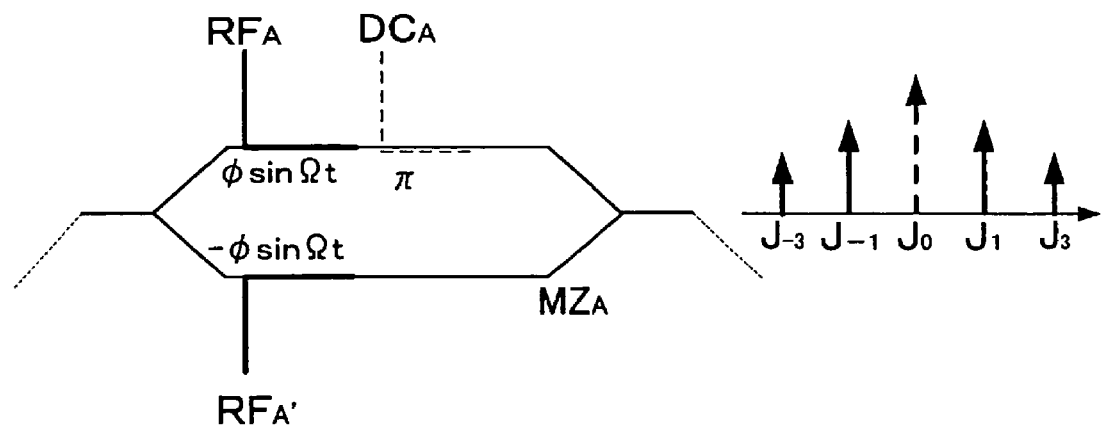
FIG. 3 is a diagram showing the function of the sub MZ waveguide of the SSB optical modulator.

For example, a modulating signal $RF_A$ and a DC bias voltage $DC_A$ are applied into the optical modulating section related to $MZ_A$ to perform optical modulation as shown in FIG. 3.

The optical modulating section related to $MZ_B$ is basically the same as $MZ_A$. The optical modulating section related to $MZ_C$ is configured to provide a predetermined phase difference by a DC bias voltage $DC_C$.

The device for controlling bias of optical modulator is schematically explained.

Focusing on sub MZ type optical waveguide $MZ_B$, 2 is a low frequency electrical signal superposing circuit having the functions of superposing a low frequency electrical signal $f_B$ on a modulating signal b and amplifying the modulating signal. Output from low frequency electrical signal superposing circuit 2 is applied into sub MZ type optical waveguide $MZ_B$ as a modulating signal $RF_B$. Then, the optical wave propagating through said optical waveguide receives predetermined modulation. 3 indicates a DC bias application circuit, which applies a predetermined DC bias voltage $DC_B$ into sub MZ type optical waveguide $MZ_B$.

The optical wave propagating through sub MZ type optical waveguide $MZ_B$ interferes with the optical wave propagating through another sub MZ type optical waveguide $MZ_A$ at the combining element of main MZ type optical waveguide $MZ_C$. Then, it is output from optical modulator 1 as an outgoing optical wave.

One portion of said outgoing optical wave enters an optical detector 9 by a photo coupler 12. Optical detector 9 outputs a signal corresponding to the change of light intensity. The change of light intensity of low frequency electrical signal $f_B$ included in the output signal from optical detector 9 is detected by a low frequency electrical signal component detecting circuit 5, and is output to a bias controlling circuit 4. In addition, low frequency electrical signal $f_B$ is applied into low frequency electrical signal component detecting circuit 5 as a reference signal.

Bias controlling circuit 4 calculates the most appropriate DC bias voltage $DC_B$ based on the value of the change of light intensity related to the low frequency electrical signal to control DC bias application circuit 3 as disclosed in the above Japanese Patent Laid-open No. S49-42365, and Japanese Patent Laid-open No. H3-251815.

A region B enclosed by the dotted line in FIG. 4 indicates a bias controlling means against sub MZ type optical waveguide $MZ_B$. A region A also indicates a bias controlling means against sub MZ type optical waveguide $MZ_A$.

Focusing on main MZ type optical waveguide $MZ_C$, a signal c, which directs the initial value of a voltage applied as DC bias voltage $DC_C$, is input into a bias controlling circuit 7. Said bias controlling circuit 7 controls a DC bias application circuit 6 corresponding to said input signal c to supply a predetermined voltage to $DC_C$. Further, a low frequency electrical signal $f_C$ is input into DC bias application circuit 6, and the voltage formed by superposing said low frequency electrical signal on the applied voltage corresponding to bias controlling circuit 7 is supplied to $DC_C$.

If input signal c is changed, the DC bias voltage formed by superposing a low frequency electrical signal on a predetermined voltage corresponding to said signal c is supplied to $DC_C$. Then, an optical wave propagating through main MZ type optical waveguide $MZ_C$ receives predetermined phase difference modulation corresponding to said applied voltage.

The optical wave propagating through main MZ type optical waveguide $MZ_C$ exits from optical modulator 1 after receiving said phase modulation, and is output to the exterior as a light signal.

As described above, one portion of the outgoing optical wave enters optical detector 9 by photo coupler 12. The change of light intensity of low frequency electrical signal $f_C$ included in the output signal of optical detector 9 is detected by a low frequency electrical signal component detecting circuit 8, and is output to bias controlling circuit 7. In addition, low frequency electrical signal $f_C$ is applied into low frequency electrical signal component detecting circuit 8 as a reference signal.

Bias controlling circuit 7 calculates the most appropriate DC bias voltage $DC_C$ based on the change of light intensity related to the low frequency electrical signal to control DC bias application circuit 6.

A region C enclosed by the dotted line in FIG. 4 indicates a bias controlling means against main MZ type optical waveguide $MZ_C$.

Next, a method for controlling bias using the above described device for controlling bias of optical modulator is explained.

When an incident optical wave is input into optical modulator 1, the optical wave is branched into sub MZ type optical waveguides $MZ_A$ and $MZ_B$ in optical modulator 1. The optical wave propagating through sub MZ type optical waveguide $MZ_B$ is modulated by modulating signal $RF_B$ formed by superposing low frequency electrical signal $f_B$ on an input signal b. At the same time, the optical wave propagating through sub MZ type optical waveguide $MZ_A$ is likewise modulated by modulating signal $RF_A$ formed by superposing a low frequency electrical signal $f_A$ on an input signal a not shown in the figure.

Main MZ type optical waveguide $MZ_C$ adds a predetermined phase difference to the optical waves modulated by two sub MZ type optical waveguides. Then, the optical wave exits from optical modulator 1 as a light signal. In addition, said phase difference corresponds to DC bias voltage $DC_C$ formed by superposing low frequency electrical signal $f_C$ on a predetermined voltage that corresponds to input signal c.

One portion of the outgoing optical wave from optical modulator 1 enters optical detector 9 by photo coupler 12. Output from the optical detector is input into bias controlling means A, B and C respectively, whereby DC bias voltages $DC_A$, $DC_B$ and $DC_C$ are controlled by the above described procedures of respective bias controlling means.

The present embodiment is characterized in that it becomes possible to accurately understand the state of each optical modulating section by using specific low frequency electrical signals $f_A$, $f_B$ and $f_C$ respectively for bias controlling means A, B and C, performing optical modulation by each low frequency electrical signal at each optical modulating section $MZ_A$, $MZ_B$ and $MZ_C$, and detecting the changes of light intensity corresponding to said low frequency electrical signals from the output signals of the optical detector.

Thus, even when the optical modulator is used for ordinary communications or the like, it is possible to disregard the influences on the communications by using a relatively low frequency electrical signal compared with the frequency of said communications signal. Further, it is possible to perform control of the bias of optical modulating sections.

In order to improve the extracting and detecting accuracy of the signal component of each low frequency electrical signal from the output signal of the optical detector, it is preferable to set the frequencies of the low frequency electrical signals to different frequencies from each other, Especially when the frequencies of the low frequency electrical signals made not to be the integral multiplication of each other, better detection performance can be realized.

Figure 5:
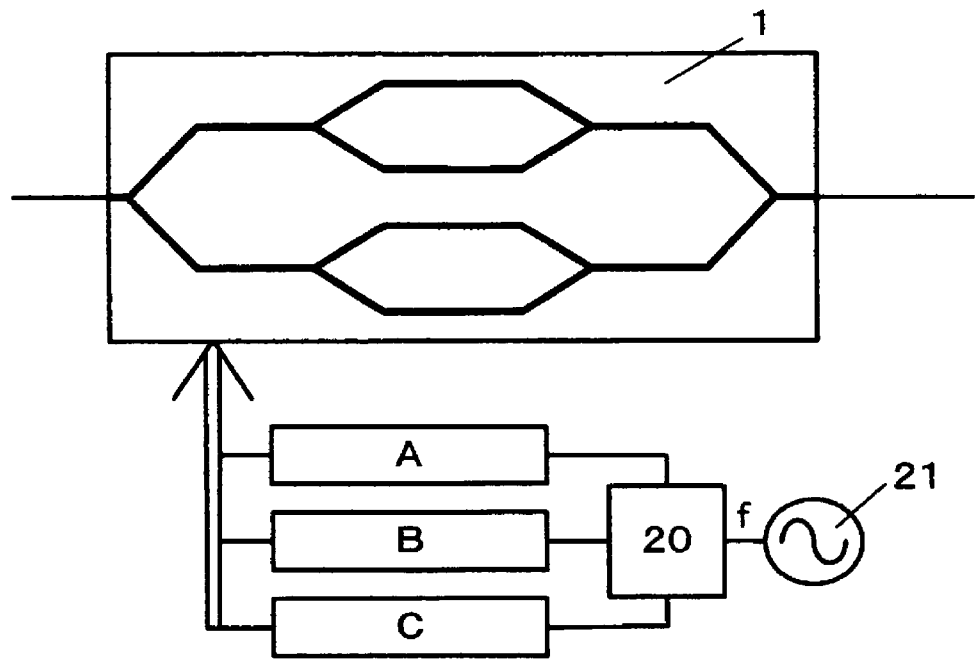
FIG. 5 is a diagram showing one example of the method for applying a low frequency electrical signal according to the present invention.

In addition, it is also possible to use a low frequency electrical signal f by sequentially switching the low frequency electrical signal to be applied into bias controlling means A, B and C by an output switching means 20 at predetermined timings as shown in FIG. 5.

In this case, each bias controlling means is configured to operate only while the low frequency electrical signal is input to perform the above mentioned bias control.

Next, another embodiment of the method for optical detection according to the present invention is explained.

Figure 6:
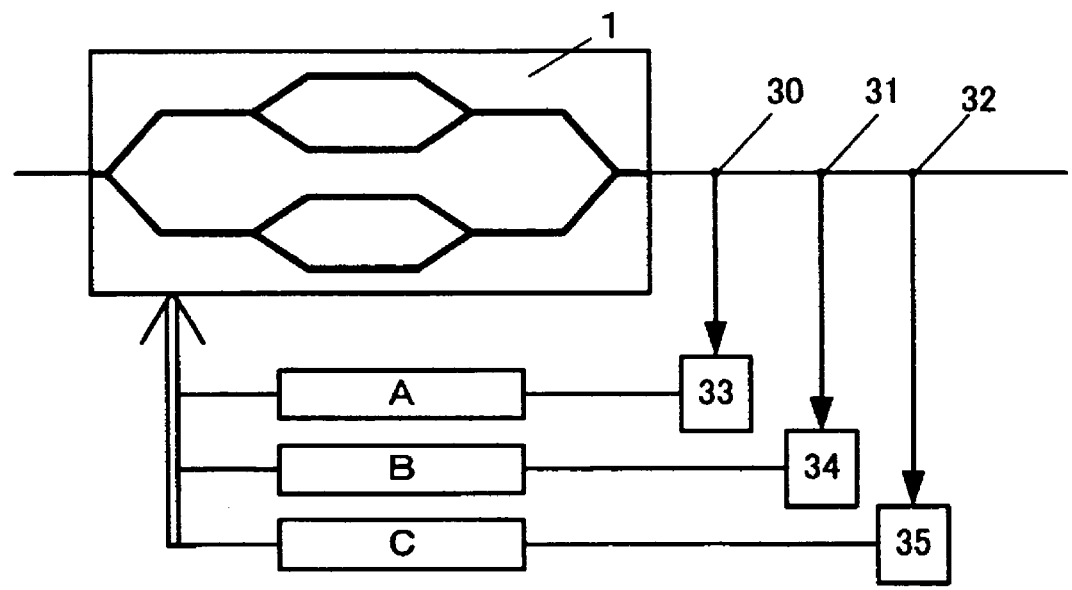
FIG. 6 is a diagram showing one example of the method for optical detection according to the present invention.

In FIG. 6, optical branching means 30, 31 and 32, such as a branching waveguide, polarization beam splitter and photo coupler, are used to guide one portion of the outgoing optical wave into optical detectors 33, 34 and 35. By directly detecting the light signal exiting from the optical modulator as described above, it becomes possible to accurately understand the input/output characteristics of the whole optical modulator or of each optical modulating section. Moreover, even when it is difficult to place the optical detectors adjacent to the optical modulator, an optical fiber or the like that guides the outdoing light from the optical modulator to the exterior may be interposed, and the optical branching means may be placed in its middle, to thereby allow optical detection anywhere.

Furthermore, because bias controlling means respectively comprise optical detectors 33 to 35 respectively, each optical detector handles one optical modulating section. Thus, it is possible to select an optical detector corresponding to the frequency of the low frequency electrical signal. This increases the range of said frequency choices while the burden on the circuit for extracting the change of light intensity corresponding to each low frequency electrical signal can be reduced.

Figure 7:
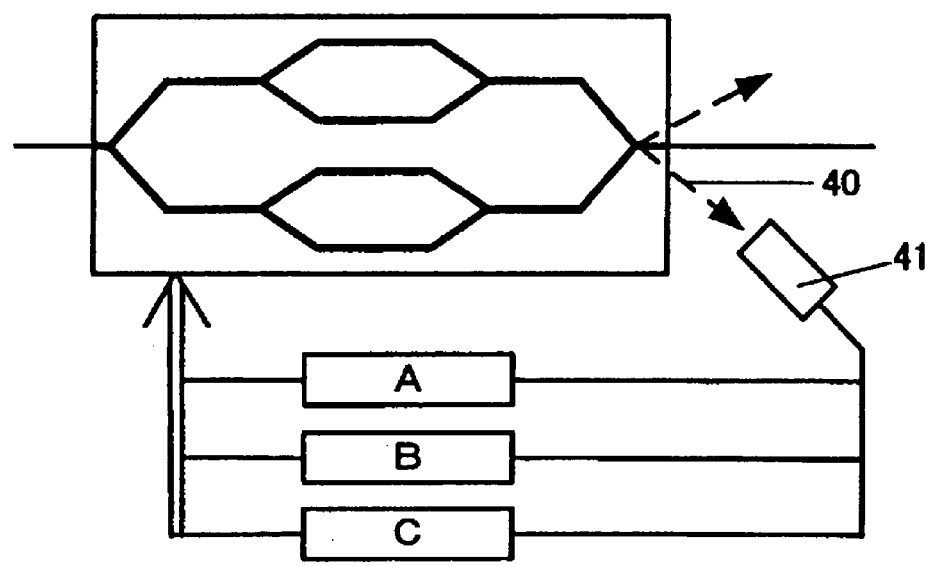
FIG. 7 are diagrams showing other examples of the method for optical detection according to the present invention.
Figure 7:
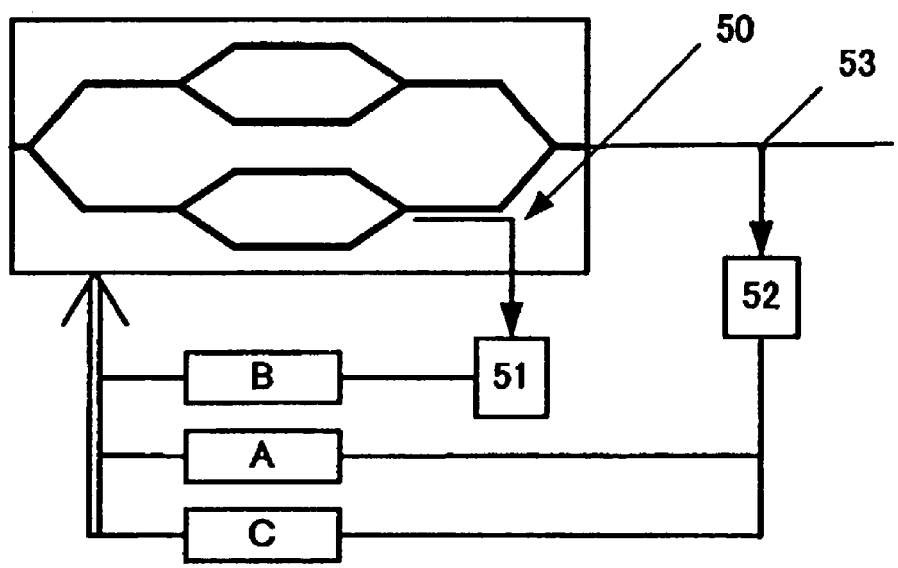

In FIG. 7(a), a method for detecting an optical wave (stray light) 40, which is emitted into the substrate from the optical waveguide, by an optical detector 41 is shown as the method for optical detection. For the optical modulator, a stray light is emitted into the substrate from the combining element of the optical waveguides or the like as stated above. By utilizing said stray light effectively, it becomes possible to avoid degradation of the signal light exiting from the optical modulator without detecting the signal light directly or one portion of it.

In addition, FIG. 7(b) shows that the optical wave guided out by a directional coupler 50 positioned adjacent to the optical waveguide is detected by an optical detector 51. An optical detector 52 is used for detecting the state of the optical waves used for bias controlling means A and C.

As stated above, it becomes possible to detect anywhere the optical wave propagating through the optical waveguide on the substrate by using the directional coupler or the like. Further, because the directional coupler can be formed by the same process as the optical waveguide on the substrate, it can be formed at the same time as the optical waveguide.

Such method for optical detection is especially effective when it is difficult to detect the signal corresponding to the state of the relevant optical modulating section from the outgoing optical wave of the optical modulator, or when it is necessary to remove the influences of the relevant optical modulating section from the change of light intensity of the outgoing optical wave of the whole optical modulator.

Subsequently, a control method by measuring the drift phenomenon of at least one optical modulating section out of a plurality of optical modulating sections to apply the result to correction of the DC bias of the other optical modulating sections is explained.

When a plurality of optical modulating sections are incorporated into one substrate and drift phenomena occur in some of said plurality of optical modulating sections, there is generally a high possibility that drift phenomena occur in the other optical modulating sections as well. In addition, the optical modulating sections are on the same substrate, and therefore, the causes of the drift phenomena, such as the temperature change of the substrate, are the same. Thus, state changes due to the drift phenomena tend to be similar. Especially for other optical modulating sections positioned adjacent to the optical modulating section, change of light intensity of which is measured, or among optical modulating sections positioned symmetrically as the SSB optical modulator, the states of drift phenomena tend to be similar.

By utilizing the above characteristic, it becomes possible to measure the drift phenomenon of at least one optical modulating section out of the plurality of optical modulating sections to control the DC biases of the other optical modulating sections based on the measurement result.

Figure 8:
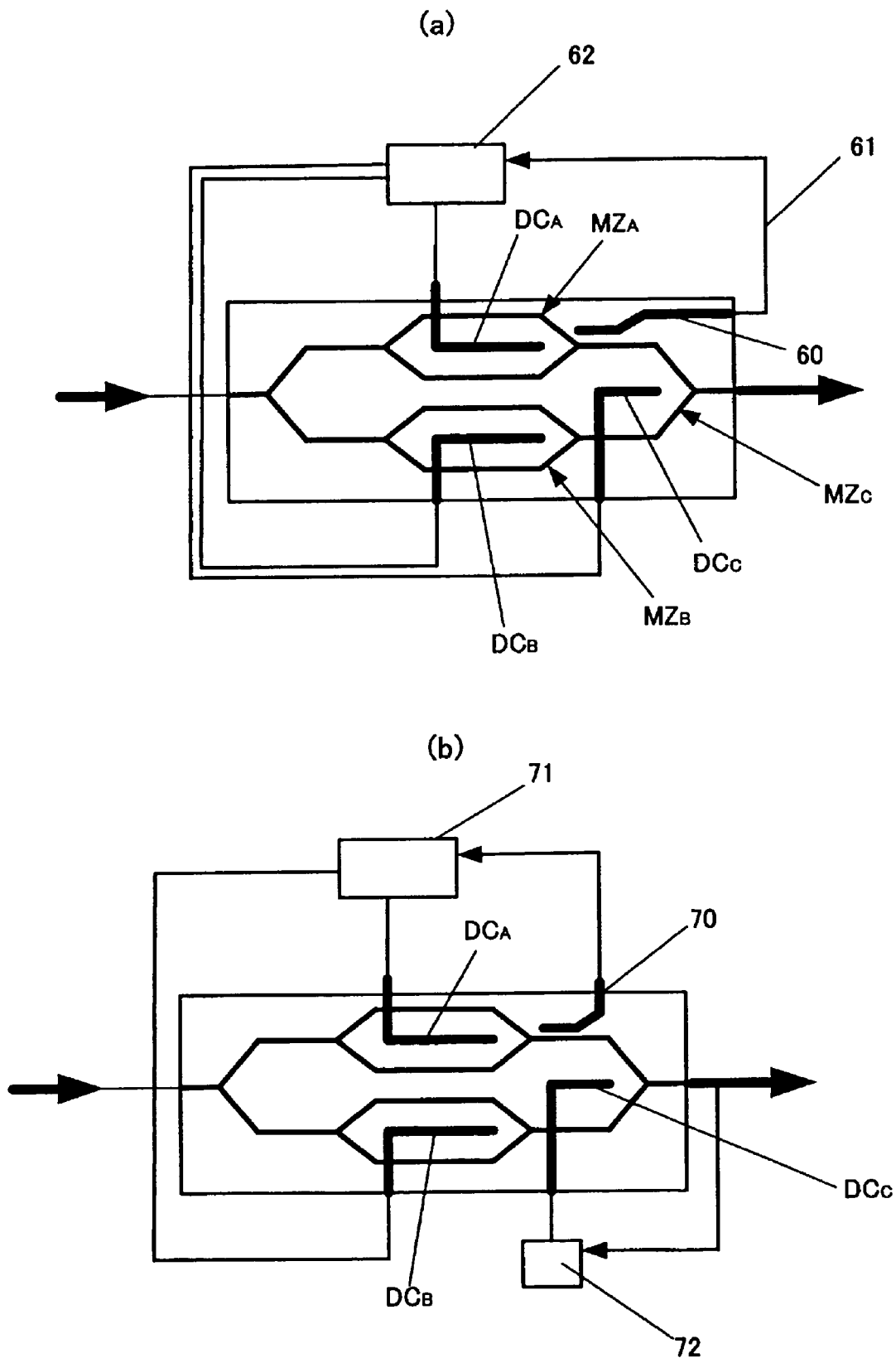
FIG. 8 are diagrams showing the method for controlling, based on the condition of some of the optical modulating sections, the other optical modulating sections according to the present invention.

As the specific example, FIGS. 8(a) and (b) show the examples of applying the result measured in the specific optical modulating section to the other optical modulating sections.

FIG. 8(a) shows the method for controlling not only the optical modulating section, sub $MZ_A$, but also the other optical modulating sections, sub $MZ_B$ and main $MZ_C$, from the drift phenomenon measured in sub $MZ_A$.

In the first place, the low frequency electrical signal is superposed on the optical modulating section, sub $MZ_A$. One portion of the optical wave exiting from said optical modulating section $MZ_A$ is taken out by a directional coupler 60.

Then, a light signal 61 detected by the optical detector not shown in the figure is input into a bias controlling means 62 as stated above.

Bias controlling means 62 measures the change of light intensity corresponding to the superposed low frequency electrical signal, assesses the state of the drift phenomenon caused in sub $MZ_A$, and sets DC bias $DC_A$ applied into sub $MZ_A$ to an appropriate value.

Bias controlling means 62 also sets each DC bias $DC_B$ and $DC_C$ to an appropriate value respectively for sub $MZ_B$ and main $MZ_C$ based on the above mentioned change of light intensity indicating the drift phenomenon of sub $MZ_A$.

For example, because sub $MZ_A$ and sub $MZ_B$ are of symmetrical shape, the amounts of correction of the DC biases are made to be the same as well. For main $MZ_C$, the correlation between the drift phenomenon of sub $MZ_A$ and the drift phenomenon of main $MZ_C$ is preliminarily measured. Based on the correlation, the appropriate value of DC bias $DC_C$ of main $MZ_C$ is calculated.

The controlled variable of DC bias varies due to various factors such as the substrate state, the operating environment or the like, as well as the shape of the optical modulating section. If the correlation between the drift phenomena of optical modulating sections incorporated into an optical modulator can be predicted at the design stage of the optical modulator, the above mentioned bias controlling means 62 can be set based on the correlation. However, if the set variable varies by the material of each optical modulator, it is preferable to set a correlation with respect to each optical modulator or to allow correction of the set value of a pre-set correlation.

FIG. 8(b) shows the method for controlling sub $MZ_A$ and sub $MZ_B$ from the drift phenomenon measured in the optical modulating section, sub $MZ_A$.

In addition, the optical wave taken out from a directional coupler 70 is configured to exit in the almost vertical direction to the optical axis of the whole optical modulator. Thus, the output part of the directional coupler can be placed anywhere on the substrate by the location of the optical detector, or the configuration and location of the whole device including the optical modulator.

The methods for controlling sub $MZ_A$ and sub $MZ_B$ are basically the same as FIG. 8(a). The outgoing light from directional coupler 70 is introduced into the optical detector not shown in the figure. The light signal from said optical detector is input into a bias controlling means 71. Then, bias controlling means 71 sets DC biases $DC_A$ and $DC_B$ to optimum values to perform control.

On the other hand, main $MZ_C$ is controlled by another bias controlling means 72.

The present invention is not limited to the above description, but it comprises, for example, an optical modulator comprising a plurality of optical modulating sections as a whole by combining the plurality of optical modulators besides the one that forms the plurality of optical modulating sections on the single substrate as described above. It also comprises the one that combines some of the optical waves from a plurality of optical modulating sections besides the one that combines all the optical waves from the plurality of optical modulating sections. Further, it is obviously possible to apply the well-known technology in the art to the present invention without departing from the scope of the present invention.

As described above, the present invention can provide the method and device for controlling bias of optical modulator capable of adequately correcting the DC bias of each optical modulating section of the optical modulator comprising the plurality of optical modulating sections even while the optical modulator is operating in normal mode and even with a simple structure.

The invention claimed is:

1. A method for controlling bias of optical modulator for controlling a DC bias of each of a plurality of optical modulating sections of an optical modulator comprising an optical waveguide formed on a single substrate with an electro-optic effect, and the plurality of optical modulating sections for modulating optical waves propagating through the optical waveguide, and being configured so as to combine the optical waves modulated by the plurality of optical modulating sections, comprising the steps of:

superposing a low frequency electrical signal with a specific frequency on a modulating signal or a DC bias applied into a specific first one of the plurality of optical modulating sections;

detecting a change of light intensity corresponding to the low frequency electrical signal from the optical wave exiting from the specific first optical modulating section, into which the modulating signal or the DC bias superposed with the low frequency electrical signal is applied;

and controlling the DC biases of the specific first optical modulating section and at least one second optical modulating section, into which the modulating signal or the DC bias without superposing of the low frequency electrical signal is applied, based on the detected change of light intensity.

2. The method for controlling bias of optical modulator according to claim 1, wherein the control of the DC biases of said second optical modulating section is performed by determining a controlled variable with respect to said second optical modulating section based on said change of light intensity.

3. A device for controlling bias of optical modulator for controlling a DC bias of each of a plurality of optical modulating sections of an optical modulator comprising a single substrate with an electro-optic effect, an optical waveguide formed on the substrate, the plurality of optical modulating sections for modulating optical waves propagating through the optical waveguide, and a combining element provided for the optical waveguide for combining the optical waves modulated by the plurality of optical modulating sections, further comprising:

a DC bias application means for applying a DC bias into each of the plurality of optical modulating sections;

a low frequency electrical signal superposing circuit for superposing a low frequency electrical signal with a specific frequency on a modulating signal or a DC bias applied into a specific first one of the plurality of optical modulating sections;

an optical detecting means for detecting a change of light intensity corresponding to the low frequency electrical signal from the optical wave exiting from the specific first optical modulating section, into which the modulating signal or the DC bias superposed with the low frequency electrical signal is applied;

and a bias controlling means for extracting the change of light intensity corresponding to the low frequency electrical signal from the optical detecting means and for controlling the DC bias application means of the specific first optical modulating section and at least one second optical modulating section, into which the modulating signal or the DC bias without superposing of the low frequency electrical signal is applied, based on the extracted change of light intensity.

4. The device for controlling bias of optical modulator according to claim 3, wherein the optical detecting means detects an optical wave emitted from the optical waveguide into the substrate.

5. The device for controlling bias of optical modulator according to claim 3, wherein the optical detecting means detects an optical wave guided out by a directional coupler positioned adjacent to the optical waveguide.

6. The device for controlling bias of optical modulator according to claim 3, wherein the optical detecting means detects an optical wave, which exits from the optical modulator and is thereafter branched by an optical branching means.

7. The method for controlling bias of optical modulator according to claim 1, wherein the optical waveguide comprises a structure which has two sub Mach-Zehnder waveguides placed in parallel in each arm of a main Mach-Zehnder waveguide.

8. The method for controlling bias of optical modulator according to claim 7, wherein said specific first optical modulating section is one including a first one of the sub Mach-Zehnder waveguides, and said second optical modulating section is one including a second one of the sub Mach-Zehnder waveguides or the main Mach-Zehnder waveguide.

9. The device for controlling bias of optical modulator according to claim 3, wherein the optical waveguide comprises a structure which has two sub Mach-Zehnder waveguides placed in parallel in each arm of a main Mach-Zehnder waveguide.

10. The device for controlling bias of optical modulator according to claim 9, wherein said specific first optical modulating section is one including a first one of the sub Mach-Zehnder waveguides, and said second optical modulating section is one including a second one of the sub Mach-Zehnder waveguides or the main Mach-Zehnder waveguide.

* * * * *